United States Patent [19]

Ognisty et al.

[11] Patent Number: 5,709,780
[45] Date of Patent: Jan. 20, 1998

[54] PARTITIONED DISTILLATION COLUMN

[75] Inventors: Thomas P. Ognisty, The Woodlands, Tex.; David B. Manley, Rolla, Mo.

[73] Assignee: The M. W. Kellogg Company, Houston, Tex.

[21] Appl. No.: 766,369

[22] Filed: Dec. 12, 1996

Related U.S. Application Data

[63] Continuation of Ser. No. 448,064, Jul. 24, 1995.
[51] Int. Cl.$^6$ ............................................... B01D 3/14
[52] U.S. Cl. ........................... 202/158; 202/161; 202/178; 261/114.5; 196/99
[58] Field of Search .................. 202/153, 154, 202/155, 156, 158, 172, 161; 261/114.5; 196/99, 100

[56] References Cited

U.S. PATENT DOCUMENTS

| | | | |
|---|---|---|---|
| 1,915,681 | 6/1933 | Luster. | |
| 3,412,016 | 11/1968 | Graven | 196/99 X |
| 4,230,533 | 10/1980 | Giroux | 203/1 |
| 5,339,648 | 8/1994 | Lockett et al. | 62/24 |

*Primary Examiner*—Christopher Kim
*Attorney, Agent, or Firm*—John P. Ward

[57] ABSTRACT

An integrated distillation column having a partitioned stripping or absorption section is presented. The integrated stripping/distillation column comprises a single shell housing a refluxed absorption section and a reboiled stripping section. The stripping section is partitioned by a vertical wall into first and second separate portions having upper end in fluid communication the absorption section. The stripping portions include fluid isolated lower ends having separate reboilers. In the integrated absorption/distillation column, the absorption section is partitioned and separate reflux loops are provided for each portion of the absorption section. In such a manner, a two column distillation process can be combined into one for achieving space and equipment savings.

4 Claims, 2 Drawing Sheets

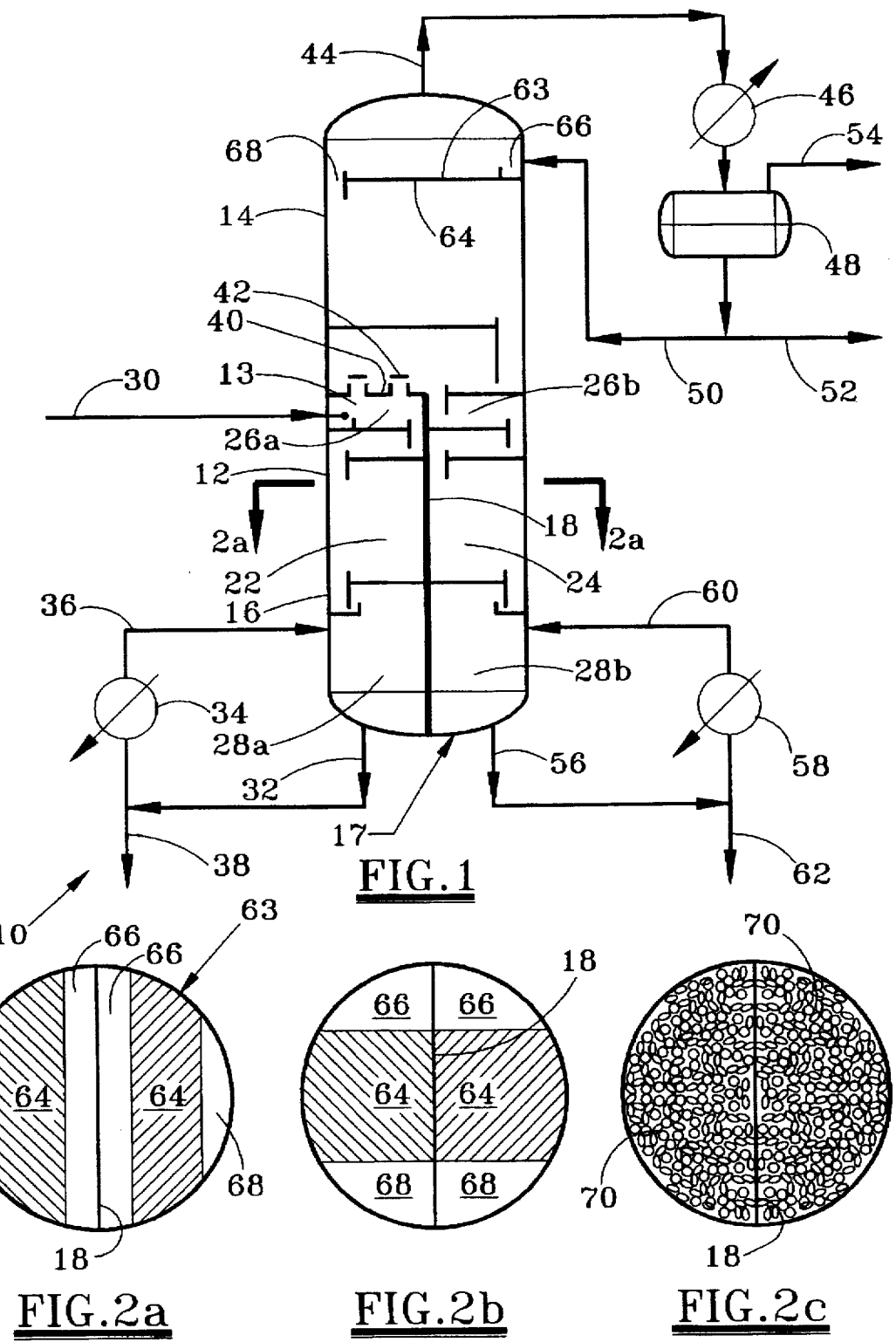

PARTITIONED DISTILLATION COLUMN

This application is a continuation of application Ser. No. 08/448,064, filed Jul. 24, 1995.

FIELD OF THE INVENTION

The present invention relates to a distillation column, and more particularly to a distillation column comprising a partitioned stripping or absorption section to combine an upstream stripper or absorber with a main distillation column.

BACKGROUND OF THE INVENTION

In the art of distilling hydrocarbons, a primary distillation column such as a depropanizer, de-ethanizer, demethanizer, or the like is frequently coupled with a secondary fractionation column commonly known as a feed prestripper or pre-absorber, depending on the process involved and the composition and state of the stream. In an ethylene plant, for example, a prestripping column is often used to reduce the concentration of heavier components in the feed to an energy intensive demethanizer column to reduce the refrigeration requirements thereof. The use of separate columns for each fractionation step is relatively costly in terms of the space and equipment required.

U.S. Pat. No. 4,230,533 to Giroux describes a fractionation column having a vertical partition positioned within the column in a central region between an upper and lower vapor-liquid contact tray and divides the central region into first and second chambers defined by the upper and lower trays, column shell and partition.

U.S. Pat. No. 1,915,681 to Luster describes a bubble tower comprising a shell having several compartments for fractionating cracked products to allow the withdrawal of heavy residual products therefrom into which fresh gas oil or other charging stock is fed without drawing off the charging stock and thereby losing part of the conversion during the cracking operation. The tower is provided with a partition wall in the middle section running through several compartments and dividing them into passageways.

SUMMARY OF THE INVENTION

The present invention integrates a primary distillation column with a secondary feed prestripper or pre-absorber in a single column where the fractionation steps are conducted at the same general pressure to institute space and equipment savings in the fractionation process.

A novel, integrated distillation column of the present invention comprises a partitioned stripping or absorption section which combines the function of a main distillation column and a feed prestripper or pre-absorber. The partitioned section of the column is formed by a vertical wall sealingly extending the length thereof. Each portion of the partitioned section has a separate reboiler in the case of a partitioned stripping section or a separate condenser in the case of a partitioned absorption section.

In one embodiment, the present invention provides an integrated stripper/distillation column. A single column housing is provided with a refluxed upper absorption section and a lower stripping section. A generally vertical wall is provided for partitioning the stripping section into first and second separate portions having an upper end in fluid communication with a lower end of the absorption section. A feed zone adjacent the upper end of the first portion of the stripping section is provided for receiving a primarily liquid feed stream and passing vapor to the lower end of the absorption section. First and second respective reboilers are provided for heating the first and second portions of the stripping section. First and second respective bottoms streams allow for recovery of bottoms products from the stripping section. The first bottoms stream is relatively less volatile than the second bottoms stream. An overhead stream is provided for recovering a distillate product from the absorption section.

In a preferred embodiment of the integrated stripper/distillation column, the vertical wall is thermally insulated. A distribution pan is provided in the first portion of the stripping section to allow vapor to pass up from the feed zone to the absorption section and divert liquid coming down from the absorption section to the second portion of the stripping section. The absorption and stripping sections optionally and preferably have equal diameters. The stripping section optionally and preferably employs packing to effect vapor-liquid contact, and the absorption section employs packing or trays.

In another embodiment, the present invention provides an integrated absorber/distillation column. A single column housing is provided with an upper absorption section and a reboiled tower stripping section. A generally vertical wall partitions the absorption section into first and second separate portions with a lower end in fluid communication with an upper end of the stripping section. A feed zone adjacent the lower end of the first portion of the absorption section is provided for receiving a primarily vapor feed stream and passing liquid to the stripping section. First and second respective reflux condensers are provided for cooling the first and second portions of the absorption section. First and second respective overhead product streams allow for recovery of distillate products from the first and second portions of the absorption section. The distillate product in the first overhead product stream is relatively more volatile than the distillate product in the second overhead product stream. A bottoms stream is provided for recovering a bottoms product from the stripping section.

In a preferred embodiment of the integrated absorber/distillation column, the vertical wall is thermally insulated. A distribution pan is provided in the first portion of the absorption section to allow liquid to pass down from the feed zone to the stripping section and divert vapor coming up from the stripping section to the second portion of the absorption section. The absorption and stripping sections optionally and preferably have equal diameters. The first and second portions optionally and preferably employ packing to effect vapor-liquid contact, and the stripping section employs packing or trays.

BRIEF DESCRIPTION OF THE DRAWINGS

FIG. 1 is a schematic representation of an integrated stripper/distillation column of the present invention comprising a partitioned stripping section having separate reboilers.

FIG. 2a is a cross-sectional view of the partitioned stripping section of the column of FIG. 1 using a parallel tray arrangement shown along the lines 2–2a in FIG. 1.

FIG. 2b is a cross-sectional view of an alternative embodiment of a partitioned stripping section similar to that in FIG. 2a, but employing a transverse tray arrangement.

FIG. 2c is a cross-sectional view of another alternative embodiment of a partitioned stripping section similar to that of FIGS. 2a and 2b, but employing column packing.

DETAILED DESCRIPTION OF THE INVENTION

Figure 3:
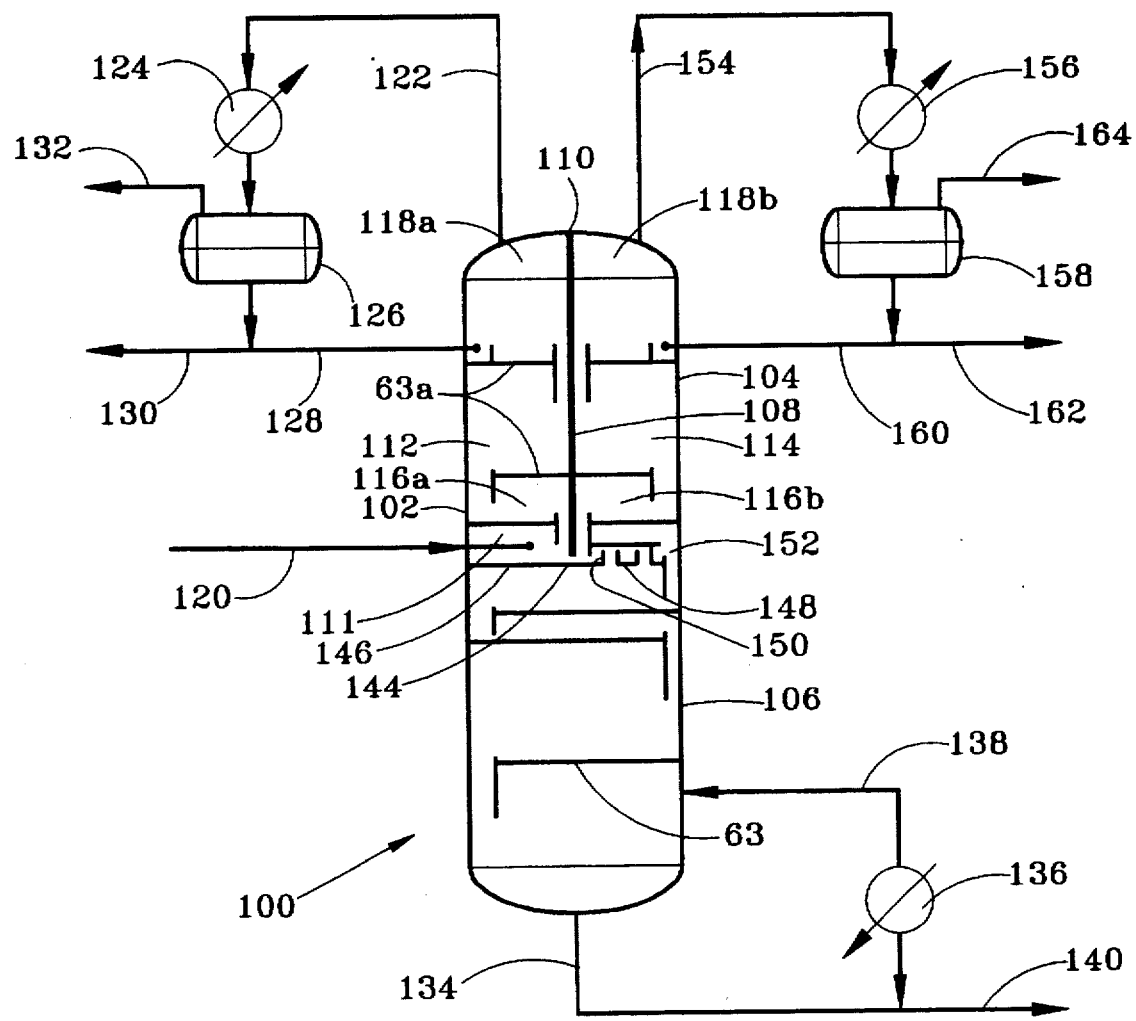
FIG. 3 is a schematic representation of an integrated absorber/distillation column of the present invention comprising a partitioned absorption section having separate condensers.

Serial fractionation columns as exemplified by a main distillation column having either an upstream stripper or absorber can be integrated into a single column of the present invention comprising a stripping or absorption section mechanically partitioned by a thermally insulated wall. Each portion of the partitioned section has a separate reboiler in the case of a partitioned stripping section or a separate condenser in the case of a partitioned absorption section. The integrated column of the present invention is particularly useful in cramped space circumstances and can produce equipment savings.

Referring to FIGS. 1 and 2a, there is shown a distillation column 10 of the present invention having a feed prestripper column integrated with a main column. The distillation column 10 comprises a vertically oriented shell 12 having an upper absorption section 14 and a lower stripping section 16. In accordance with the present invention, the stripping section 16 is partitioned by a wall 18. The wall 18 extends vertically through the shell 12 from a column feed zone 13 adjacent a lower end of the absorption section 14 to a bottom head 17 and defines an auxiliary stripping portion 22 on one side and a main distillation stripping portion 24 on the other side. The partition wall 18 preferably sealingly engages the inside wall of the shell 12 to maintain stripping portions 22, 24 in substantial fluid isolation from each other. The stripping portions 22, 24 comprise upper ends 26a, 26b in fluid communication with the absorption section 14 and separate reboil zones 28a, 28b which are in fluid isolation from each other.

In the practice of the present invention, a multicomponent liquid feed stream to be distilled is first introduced to the auxiliary stripping portion 22 to strip out the lightest components as a preliminary matter prior to further distillation. Typically, a mostly liquid feed stream is introduced through line 30 to the upper end 26a of the auxiliary stripping portion 22.

In the stripping portion 22, lighter, more volatile components in the feed liquid passing downwardly are stripped out by close contact with an upwardly flowing vapor. At the reboil zone 28a, a bottoms liquid stream substantially free of the lighter, more volatile components passes through line 32 to a portion reboiler 34. Part of the bottoms liquid is vaporized to provide stripping vapor for return to the portion 22 through line 36. Another part of the bottoms liquid is withdrawn through line 38 as a first heavy bottoms product stream.

Lighter, more volatile vapors stripped from the feed liquid in the stripping portion 22 pass upwardly to feed the absorption section 14 through a distribution pan 40 separating the stripping portion 22 from a lower end of the absorption section 14. The distribution pan 40 is designed to facilitate passage of vapor from the auxiliary stripping portion 22 therethrough and direct liquids from the absorption section 14 to the main stripping portion 24. While several designs for the distribution pan 40 are known, chimneys 42 are typically provided to allow the flow of the upwardly passing vapor, and limit the downflowing liquid to the main stripping portion 24.

In the absorption section 14, one or more heavier, less volatile components in the upwardly flowing vapor feed are absorbed therefrom by close contact with a downwardly flowing liquid. Thus, a vapor stream removed overhead from the absorption section 14 through line 44 is lean in the heavier components. The overhead vapor stream 44 comprising the lightest, most volatile components is at least partially condensed by a reflux condenser 46 to produce a liquid which is lean in heavier components for reflux to the absorption section 14. The lean liquid can be accumulated in a vessel 48 from which a part is returned to the absorption section 14 through line 50 and another part is withdrawn through line 52 as a liquid distillate product. A vapor distillate product can be withdrawn from the accumulation vessel 48 via line 54 where partial condensation is effected in the condenser 46.

Liquid which has a relatively rich concentration of the heavier components passes downwardly through the absorption section 14 to feed the main stripping portion 24. In the stripping portion 24 similarly to the stripping portion 22, lighter, more volatile components of the downwardly flowing liquid are stripped out by close contact with upwardly flowing vapor. At the reboil zone 28b, a bottoms liquid stream substantially free of the lighter, more volatile components passes through line 56 to a main reboiler 58. Part of the bottoms stream is vaporized to provide stripping vapor for return to the portion 24 through line 60. Another part of the bottoms liquid is withdrawn through line 62 as a second bottoms product stream which is relatively lighter or more volatile than the first bottoms product stream 38.

While any conventional vapor-liquid contacting means can be used, the absorption section 14 and the stripping portions 22, 24 preferably contain a suitable quantity of vapor-liquid contacting trays 63 as best seen in FIGS. 1 and 2a. Design of the tray typically includes an active vapor-dispersion zone 64 wherein vapor-liquid contacting is promoted, a peripheral seal zone 66 and a peripheral downcoming zone 68 opposite the seal zone 66. The seal zone 66 allows liquid flow from the active zone 64 to the downcomer zone 68 for passage to a lower succeeding tray. A plurality of devices (not shown), such as, for example, holes, valves, bubble caps or the like, are conventionally provided to allow vapor to pass upwardly from the lower succeeding tray. Trays are stacked alternately so that a downcomer zone 68 is positioned below or above the seal zone 66 of an adjacent lower or higher tray as well known in the art. In the partitioned stripping section 16, trays can be stacked so that the seal zone 66 of a tray 63 abuts the partition wall 18 and the shell wall in an alternating parallel fashion as illustrated in FIGS. 1 and 2a. In FIG. 2b, the trays are stacked so that the active tray zone 64', the seal zone 66' and the downcoming zone 68' extend transversely from the partition wall 18. In FIG. 2c, packing material 70 is used to fill the stripping portions 22, 24, in lieu of trays.

Referring to FIG. 3, a distillation column 100 of the present invention has a feed pre-absorber column integrated with a main distillation column in an analogous manner to the integrated stripper/distillation column 10. The column 100 comprises a vertically oriented shell 102 having an upper absorption section 104 and a lower stripping section 106. The absorption section 104 is partitioned by a wall 108. The wall 108 extends vertically through the shell 102 from a top head 110 to a column feed zone 111 adjacent an upper end of the stripping section 106 and defines an auxiliary absorption portion 112 on one side and a main absorption portion 114 on the other side. The partition wall 108 preferably sealingly engages the inside wall of the shell 102 to maintain absorption portions 112, 114 in substantial fluid isolation from each other. The absorption portions 112, 114 comprise lower ends 116a, 116b in fluid communication with the stripping section and separate reflux zones 118a, 118b which are in fluid isolation from each other.

A multicomponent vapor feed stream to be distilled is first introduced to the auxiliary absorption portion 102 to absorb the heaviest components as a preliminary matter prior to further distillation. Typically, the mostly vapor feed stream is introduced through line 120 to the lower end 116a of the auxiliary absorption portion 112.

In the absorption portion 112, heavier, less volatile components in the feed vapor passing upwardly are absorbed by close contact with a downwardly flowing liquid. At the reflux zone 118a, an overhead vapor stream substantially free of the heavier, less volatile components passes through line 122 to auxiliary reflux condenser 124. Part of the overhead stream is condensed to produce a liquid which is lean in heavier components for reflux to the auxiliary portion 112. The lean liquid can be accumulated in a vessel 126 from which one part is returned to the auxiliary portion 112 through line 128 and another part is withdrawn through line 130 as a first light distillate liquid product. A first light vapor distillate product can be withdrawn from the accumulation vessel 126 via line 132 where partial condensation is effected in the condenser 124. Liquid which has a relatively rich concentration of the heavier components passes downwardly through the auxiliary portion 112 to feed the stripping section 106.

In the stripping section 106, lighter, more volatile components in the feed liquid passing downwardly are stripped out by close contact with an upwardly flowing vapor. A liquid stream lean in lighter, more volatile components is withdrawn through line 134 to feed a reboiler 136. Part of the bottoms stream 134 is vaporized in a reboiler 136 to provide stripping vapor for return to the stripping section 106 via line 138. Another part of the bottoms stream is withdrawn as a bottoms product through line 140.

Lighter, more volatile vapors stripped from the feed liquid in the stripping section 106 pass upwardly to feed the main absorption portion 114 through a distribution pan 144 separating the stripping section 106 from a lower end of the absorption portions 112, 114. The distribution pan 144 is designed to channel the feed stream 120 into the auxiliary absorption portion 112, facilitate passage of liquids from the absorption portions 112, 114 to the stripping section 106 and direct vapor from the stripping section 106 to the main absorption portion 114. The distribution pan 144 has a transverse baffle section 146 extending across a bottom end of the main absorption portion 112 to sealingly abut the shell wall. A plurality of chimneys 148 allow vapor to pass upwardly from the stripping section 106 into the main absorption portion 114. A downcomer 150 is provided adjacent the main absorption portion 114 through which collective liquids from the absorption portions 112, 114 flow downwardly to the stripping section 106.

In the main absorption zone 114, heavier, less volatile components in the upwardly flowing vapor feed from the stripping section 106 are absorbed therefrom by close contact with a downwardly flowing liquid. At the reflux zone 118b, an overhead vapor stream comprising the lightest, most volatile components passes through line 154 to main reflux condenser 156. Part of the overhead stream is condensed to produce a liquid which is lean in heavier components for reflux to the absorption portion 114. The lean liquid can be accumulated in a vessel 158 from which one part is returned to the main absorption portion 114 through line 160 and another part is withdrawn through line 162 as a liquid distillate product. A vapor distillate product can be withdrawn from the accumulation vessel 158 via line 164 where partial condensation is effected in the condenser 156.

The integrated absorber/distillation column 100 has a vapor-liquid contacting means such as packing elements and/or trays similar to those in the stripper/distillation column 10 described above.

The partitioned portions of the present integrated distillation columns 10, 100 are operated at a relatively uniform pressure to minimize mechanical stress due to a large pressure differential across the respective walls 18, 108. Since the integrated columns 10, 100 can replace a two-column distillation process wherein a pressure differential between columns can be employed, the partitioned portions of the integrated columns 10, 100 are operated at conditions which compensate for any pressure changes to maintain desired product results. Among the compensating changes in operations which can be mentioned include, raising/lowering the reboiler/condenser temperatures, changing the reboil/reflux ratios, adding or subtracting equilibrium trays, and the like.

The partition walls 18, 108 can, if appropriate, be installed at the axial center plane of the integrated columns 10, 100 to bisect the absorption or stripping sections into substantially equal portions. Alternatively, and more typically, the partition wall is eccentrically disposed to either side of center to compensate for differences in the vapor-liquid traffic between the main and auxiliary portions. While a substantially planar wall is preferred for ease of installation, a curved or angled wall could be employed, particularly where the desired auxiliary and main portions are dissimilar in size. The length of the partition walls 18, 108 and the corresponding height of the partitioned section of the integrated distillation columns 10, 100 will depend on the number of equilibrium trays required to achieve the design separation criteria of the main and auxiliary portions.

In accordance with the present invention, the stripping or absorption portions formed by the partition walls 18, 108 are substantially thermally and materially isolated from each other and thus will typically have a different characteristic temperature and compositional profile from stage to stage. Therefore, the bottom or overhead streams from the stripping or absorption portions will have different vaporization or condensation temperatures. As a result, separate reboil/reflux loops for the partitioned portions of the distillation columns 10, 100 are provided.

The partition walls 18, 108 are preferably thermally insulated to minimize stresses induced by a potentially large temperature differential in the conjoined stripping or absorption portions, particularly where the partition walls 18, 108 are attached by welds, for example, to the shells 12, 102. The partition walls 18, 108 can have a laminate construction to establish an air gap or a layer of insulation between adjacent layers. In addition, other techniques known in the vessel and material design arts can be used to ensure thermal isolation of the partitioned section and minimize thermal stresses at the shell wall. For example, mechanical stresses in the partitioned section can be addressed by using a transverse rib or honeycomb type reinforcement of the walls 18, 108 and/or any trays in the partitioned section.

The present integrated distillation column is illustrated by way of the foregoing description and examples. The foregoing description is intended as a non-limiting illustration, since many variations will become apparent to those skilled in the art in view thereof. It is intended that all such variations within the scope and spirit of the appended claims be embraced thereby.

We claim:

1. An integrated stripper/distillation column consisting essentially of:

a vertically oriented single shell housing a refluxed upper absorption section and a lower stripping section, each of said absorption and stripping sections having multiple means for vapor liquid contacting;

a generally vertical wall partitioning the stripping section into an auxiliary stripping portion on one side of the wall for preliminarily stripping a single primarily liquid feed stream and a main distillation stripping portion on an opposite side of the wall for stripping a liquid passed downwardly from the absorption section, each of said portions having an upper end in fluid communication with the lower end of the absorption section;

a distribution pan at an upper end of the auxiliary stripping portion for separating the auxiliary stripping portion from the absorption section, for facilitating the passage of vapors from the auxiliary stripping portion upwardly to the absorption section and for limiting liquid flowing downwardly from the absorption section to the main distillation stripping portion;

a single feed line adjacent the upper end of the auxiliary stripping portion and below the distribution pan for introducing the single primarily liquid feed stream into the column;

first and second respective boilers for heating the auxiliary stripping and main distillation stripping portions of the stripping section;

first and second bottom lines for recovering first and second bottoms products from the auxiliary stripping and main distillation stripping portions respectively of the stripping section wherein the first bottoms stream is relatively less volatile than the second bottoms stream; and an overhead line for recovering a distillate product from the absorption section.

2. The column of claim 1, wherein the vertical wall is thermally insulated.

3. The column of claim 1, wherein the absorption and stripping sections have equal diameters.

4. The column of claim 1, wherein the auxiliary stripping and main distillation stripping portions are filled with a packing material.

* * * * *